US006771863B2

(12) United States Patent
Oxford et al.

(10) Patent No.: US 6,771,863 B2
(45) Date of Patent: Aug. 3, 2004

(54) FIBER OPTIC CABLE

(75) Inventors: William J. Oxford, Riverside, CA (US); John M. Cobb, Cortland, NY (US); David R. Porter, Hunstville, AL (US)

(73) Assignee: SCI Systems, Inc., Huntsville, AL (US)

( * ) Notice: Subject to any disclaimer, the term of this patent is extended or adjusted under 35 U.S.C. 154(b) by 0 days.

(21) Appl. No.: 10/237,761

(22) Filed: Sep. 9, 2002

(65) Prior Publication Data

US 2003/0113080 A1 Jun. 19, 2003

Related U.S. Application Data

(60) Provisional application No. 60/340,416, filed on Dec. 14, 2001.

(51) Int. Cl.[7] .................................. G02B 6/44
(52) U.S. Cl. ....................................... 385/113
(58) Field of Search ............................. 385/106, 107, 385/108, 110, 113

(56) References Cited

U.S. PATENT DOCUMENTS

| 4,389,088 A | * | 6/1983 | Trezequet .................... 385/111 |
| 4,497,537 A | | 2/1985 | Dench ......................... 385/108 |
| 4,557,560 A | * | 12/1985 | Bohannon et al. ........... 385/107 |
| 4,577,925 A | | 3/1986 | Winter et al. ................ 385/106 |
| 4,606,604 A | | 8/1986 | Soodak ......................... 385/15 |
| 4,679,898 A | * | 7/1987 | Grooten ...................... 385/107 |
| 4,696,542 A | | 9/1987 | Thompson ................... 385/108 |
| 4,913,516 A | | 4/1990 | Ikeda .......................... 385/108 |
| 5,013,127 A | * | 5/1991 | Bernard ....................... 385/107 |
| 5,050,957 A | | 9/1991 | Hamilton et al. ........... 385/113 |
| 5,125,062 A | * | 6/1992 | Marlier et al. .............. 385/101 |
| 5,218,658 A | * | 6/1993 | Macleod ...................... 385/107 |
| 5,333,230 A | | 7/1994 | Hata et al. ................... 385/110 |
| RE34,732 E | | 9/1994 | Iri et al. ...................... 385/109 |
| 5,509,097 A | | 4/1996 | Tondi-Resta et al. ....... 385/113 |

* cited by examiner

Primary Examiner—Tulsidas Patel
(74) Attorney, Agent, or Firm—Kramer Levin Naftalis & Frankel LLP

(57) ABSTRACT

The cable has a fiber optic core, metal wires wound around the core, and a laminate of copper tape adhered to plastic tape wound around the wires under tension.

16 Claims, 2 Drawing Sheets

FIBER OPTIC CABLE

Priority for this patent application is claimed from provisional patent application Serial No. 60/340,416, filed Dec. 14, 2001.

This invention relates to undersea cable and manufacturing methods, and, particularly to underwater fiber-optic cable and methods.

There is an ever-increasing need for the transmission of data, voice, video and other signals under water.

One source of such need is the proliferation of offshore oil exploration and production rigs, and the need for more bandwidth to support remotely controlled equipment, geological and scientific business and personal contacts, including data collection, and telecommunications for personnel on manned platforms.

It has been attempted to provide a fiber-optic communication network linking numerous off-shore oil facilities with land-based stations. However, the undersea portion of such a network has presented numerous challenges and problems.

One problem with prior undersea fiber-optic cable communication lines lies in the insufficiency of the cable. Often, the cable provided in the past has not been sufficiently robust. If sufficiently robust, it has been undesirably heavy and expensive.

Accordingly, one of the objects of the invention is to provide an underwater fiber-optic cable which solves or alleviates the foregoing problems, and particularly a cable which is relatively light-weight but robust and flexible, and resistant to environmental attacks, such as by chewing fish and other sea life.

In accordance with the present invention, the foregoing objectives are satisfied by the provision of a cable having a fiber-optic core with a plurality of metal wires wrapped around the core to give strength and cut-resistance, and a tensioned metal and plastic laminate tape, wrapped about the wires under relatively high tension. The resulting tensioned laminate is believed to compress the wires and core and hold them together while not adding unacceptably to the cable diameter, and to otherwise improve the cable.

In one aspect of the invention, a malleable metal-containing tape is wrapped about a layer of strength members surrounding a fiber-optic core to provide a relatively strong, cut and corrosion-resistant underwater cable.

The cable is highly advantageous because it exhibits relatively low strain per unit of tension applied to the cable, thus making it possible to use reduced quantities of strength members and/or relatively small diameter cable so as to reduce the cost, weight and volume occupied by reels of the cable. This facilitates laying the cable on or under the surface of the floor of the body of water in which it is used.

The cable of the invention has special utility when used with an underwater dispenser which gives the cable a reverse twist to minimize tangling—the cable is sufficiently flexible to endure the reverse twist and sharp bends often experienced during dispensing.

The foregoing and other objects and advantages of the invention will be set forth in or made apparent from the following description and drawings.

IN THE DRAWINGS

NETWORK

Figure 1:
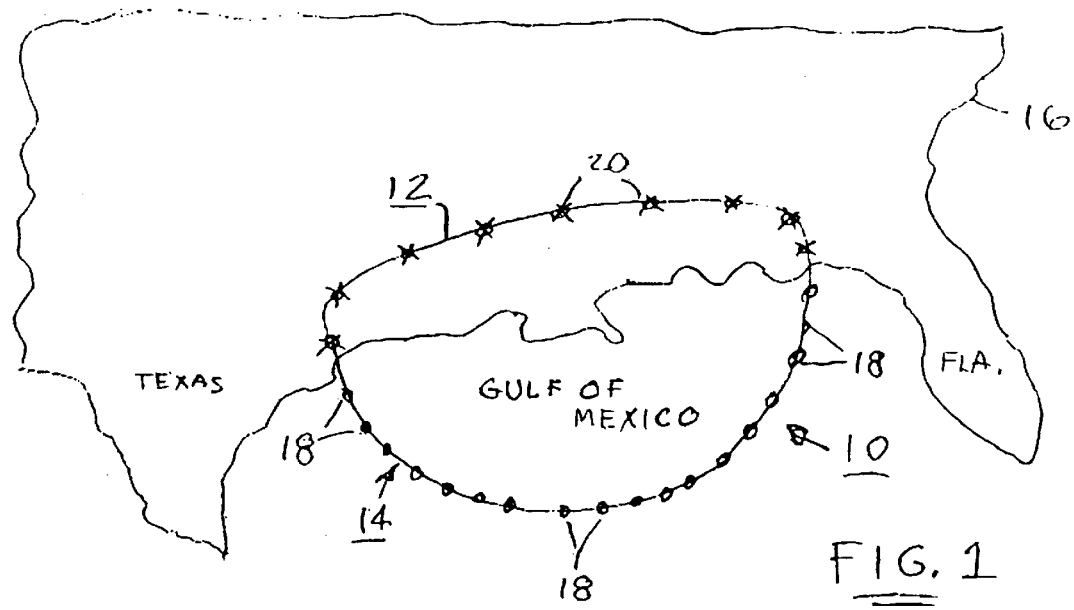
FIG. 1 is a schematic view of a fiber-optic cable telecommunications network using the present invention.

The undersea cable is intended for use in the undersea portion of a fiber-optic cable communications network 10 shown in FIG. 1. The network 10 has a portion 12 on land and a second portion 14 undersea. The network is connected to land-based stations 20, and to platforms 18 such as oil well facilities 18 extending above the surface of the ocean. The network is shown schematically superimposed on a map 16 of the southeastern portion of the U.S.A. and the Gulf of Mexico. The network will provide badly needed low-cost, high volume data and voice communications to and from offshore oil facilities.

Figure 2:
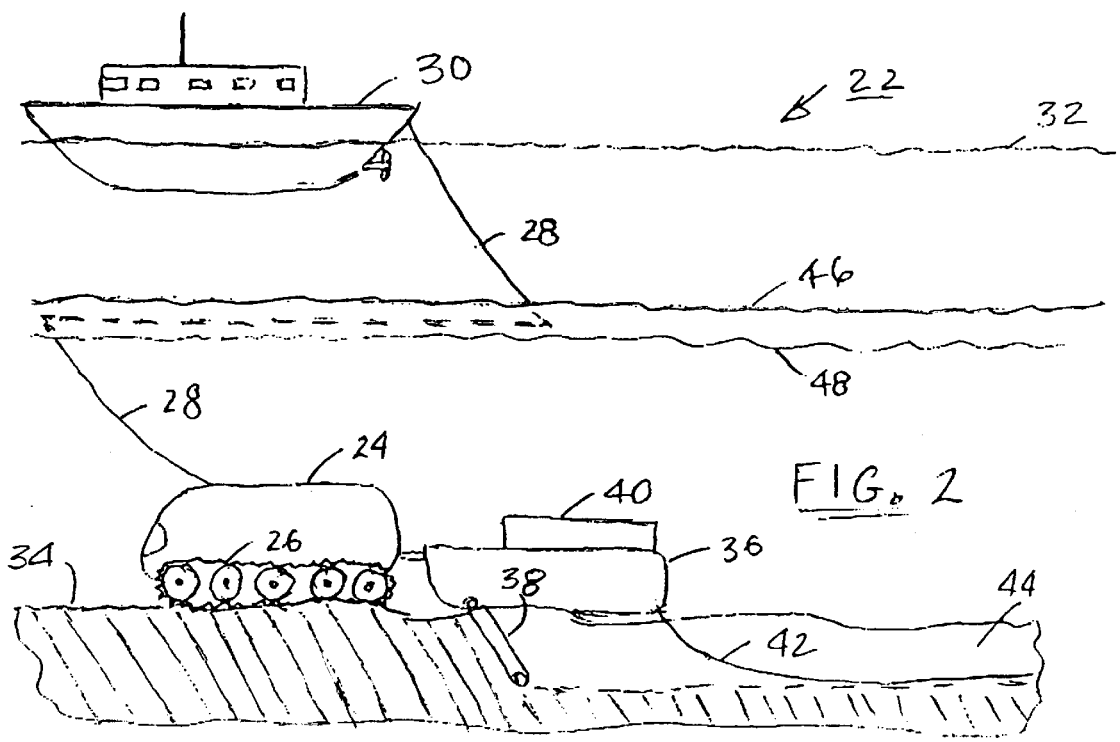
FIG. 2 is a schematic view of an underwater cable laying system utilizing the present invention.

FIG. 2 shows schematically the arrangement used to lay the cable 42 beneath the bottom 34 of the ocean to form the undersea portion of the network 10. This arrangement is of the type proposed by Ocean Specialist Inc. of Stuart, Fla.

An underwater vehicle or tractor 24 with tracks 26 is used to pull a sled 36 along the seabed 34. The sled 36 has a trencher mechanism 38 which forms a narrow trench 44 three to ten feet deep in the seabed. The sled has a cable dispenser 40 which lays the fiber-optic cable 42 in the trench, and the trench is filled in to cover the cable. The cable emerges from the seabed at each platform 18 and is connected to communications equipment on the off-shore oil facility.

The vehicle 24 and the sled receive power and command data from and deliver data to a tender ship 30 floating on the surface 32 of the ocean. The water column is shown broken at 46 and 48 to indicate the extreme depth (e.g., 900 feet or more) of the water in which the cable can be laid.

Cable

Figure 3:
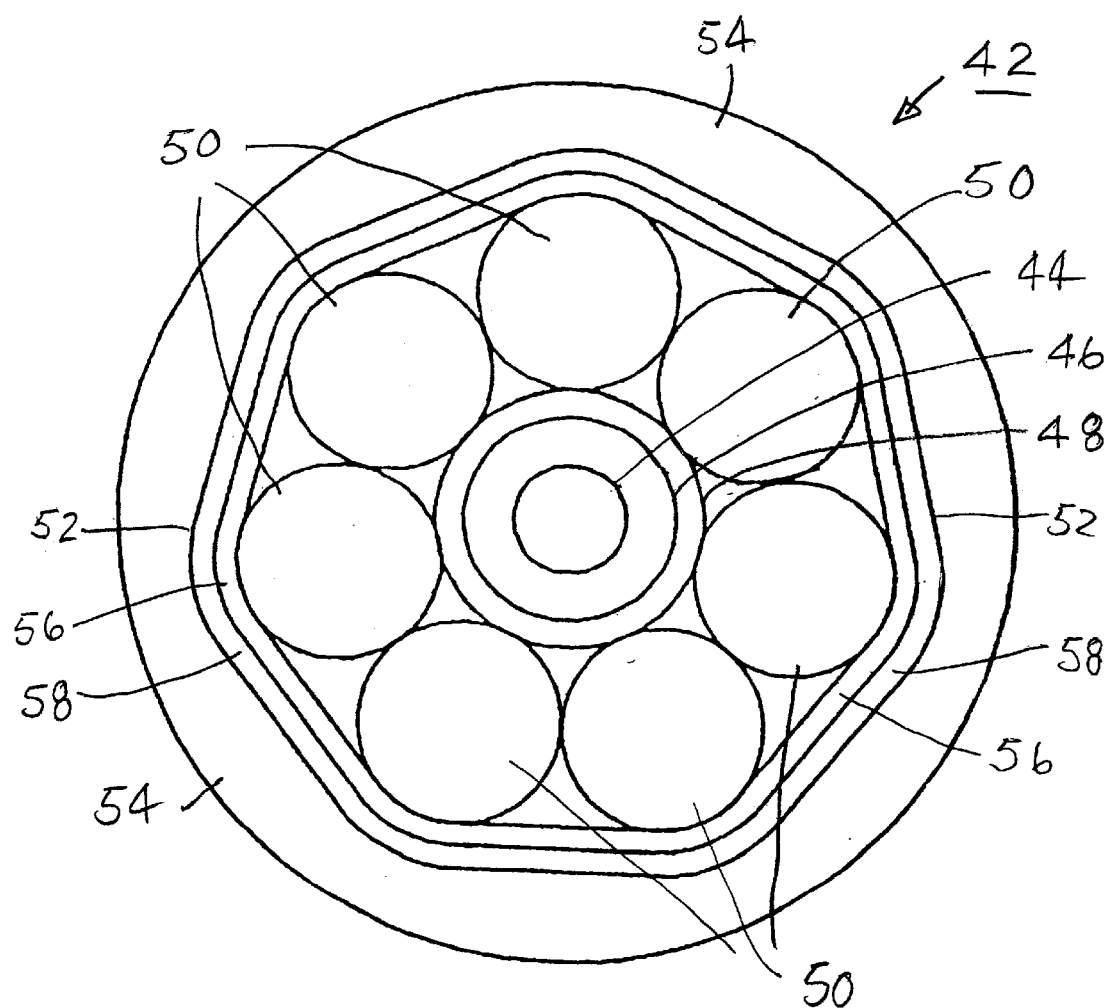
FIG. 3 is a schematic cross-sectional view of a cable constructed in accordance with the present invention.

The cable 42 to be laid using the cable-laying system described above is shown in cross-section in FIG. 3.

The cable 42 includes an optical fiber 44, with the usual cladding, a primary buffer layer 46 of Hytrel, a secondary buffer layer 48 made of nylon, and seven helical-wound wires 50 made of Inconel 625. The wires are wound with a right-hand lay and are provided to strengthen the cable.

Wound around the wires 50 is a metallic tape 52 and an extruded plastic jacket 54 made of Hytrel.

The construction of the cable is believed to be known except for the use of metallic tape 52. This tape is formed by laminating thin (about 1 mil thick) copper tape 56 to a Mylar tape 58 of the same approximate thickness, and wrapping the tape around the wires 50 under high tension; almost to the breaking point of the tape laminate.

Materials other than copper and Mylar can be used. The metal should have good malleability, and the plastic material should be tough and stable.

This improvement provides additional hoop-strength and compresses and helps hold the wires 50 in place without unduly increasing the diameter of the cable. This gives the cable excellent stability, and makes the cable elastic but resistant to torsional creep, kinking and hockling.

The cable has especially good characteristics for use with an underwater dispenser in which the cable is given a reverse twist during winding on a reel, and then is bent rather sharply during dispensing.

The preferred embodiment of the invention uses as the laminate 52 a film/foil shielding tape such as that sold under the trademark Neptape, No. 1132, by Neptco, Inc. of Pawtucket R.I., U.S.A.

It is believed that the laminate is formed by securing 0.00092 inch thick polyester (Mylar) film to 0.0007 inch thick electro-deposited copper foil with an adhesive. The laminate has a tensile strength of around 28,000 p.s.i. and a break strength of 48 lbs. per inch width. The tape is around 0.25 inch wide.

This is just one example of shielding tapes which are used in twisted-shielded conductor cable or coaxial cable shielding. The laminate has a relatively high tensile strength, and yet is relatively thin and stretches a little so as to conform closely to the shape of the strength members (wires) 50 and thus minimize any increase in diameter due to the wrap.

This also leaves the cable flexible and able to accept fairly sharp bending and a reverse twist as it is being wound on a reel. The reverse twist is imparted in order to avoid twisting and kinking as the reel dispenses the cable over one end of the reel, rather than by rotating the reel.

The tape 52 preferably is wound with the copper tape side in contact with the wires 50. The wires and the tape together provide an electrically conductive path through the cable, which can be used for grounding, signal transmission, etc. However, it is not necessary that the copper tape be the inside layer; the tape does its primary job equally well if the plastic tape is the inside layer.

The tape 52 is wound with a lay that is with or opposite to that of the strength members 50. The strength members 50 in a cable which has been built in accordance with the present invention were wound with a right-hand lay, and the tape 52 also was wound with a right-hand lay.

The lay angle at which the tape 52 is wound is relatively steep, preferably greater than 10° to 30°, whereas the lay angle of the wires 50 is relatively low, 5° to 10°, preferably 7° or 8°. The tape 52 preferably is wound with a 0 to 40 percent overlap between wraps around the cable. Spacing between wraps also is acceptable.

The strength members 50, which also are referred to as "armor wires", can be made of a number of different materials other than Inconel 625. For example, Nitronic 50, stainless steel or other hard, strong materials can be used. Preferably, the materials are corrosion-resistant.

The wires 50 preferably are applied by first pre-forming them into a helical shape, and then wrapping them around the inner part of the cable. The diameter of the wires and the tension applied to each during winding should be uniform.

The diameter of the wires 50 should be determined so that the wires fit together to form a layer of wires surrounding the core of the cable, with each wire contacting the next wire and the secondary buffer layer upon which the wires 50 are wound. When held tightly together by the tensioned tape 52, the wires form a hard protective armor body to resist cuts and provide the other benefits noted above.

The primary Hytrel buffer layer 46 is provided as a relatively soft buffer to minimize microbending of the optical fiber, as it is well known.

The secondary buffer layer of nylon provides a harder buffer layer to help spread loads received and thus to help protect the fiber optic core.

It should be understood that the arrangement of buffer layers and the construction of the innermost elements of the cable can be varied significantly, as needed or desired, without deviating from the invention.

The Hytrel outer sheath 54 is extruded onto the outer surface of the tape 52. The sheath 54 provides a water barrier. However, even if the sheath 54 is cut through, as by a fish-bite, the armor wires 50 continue to protect the optical fiber 44 unless the cutting force is relatively large.

In winding the tape 52, as noted above, the tape is wound under substantial tension, almost to the breaking strength of the tape. For example for a tape 52 having a breaking strength of around 12 pounds, a tension of 8 to 10 pounds is used. Preferably, the tension used should be in the range of 60% to 90% of breaking strength.

It should be understood that the optical fiber 44 of the cable can take a variety of different forms without deviating from the invention. The optical fiber core can have multiple different optical waveguides, and also can be single mode or multiple mode.

The above description of the invention is intended to be illustrative and not limiting. Various changes or modifications in the embodiments described may occur to those skilled in the art. These can be made without departing from the spirit or scope of the invention.

What is claimed is:

1. A fiber-optic cable core with metal wires formed about the fiber-optic cable core and a tape wound around the wires under tension, said tape comprising a laminate of a metal tape and a plastic base tape.

2. A cable as in claim 1 in which said metal tape is made of a malleable metal, and said plastic base tape is made of a tough, stable plastic material.

3. A cable as in claim 1 including an extruded plastic sheath around the outside of said laminate, and at least one buffer layer around said core between said core and said wires.

4. A cable as in claim 1 in which said tension is near the breaking point of said tape.

5. A cable as in claim 2 in which said metal is copper and said plastic base tape is polyester.

6. An underwater fiber-optic cable, said cable comprising:
   a fiber-optic core;
   a layer of metallic wire strength elements formed around said core;
   a tape comprising a laminate of plastic and metal tape wound around said layer of strength elements under tension; and
   an extruded plastic sheath covering said metallic tape.

7. A cable as in claim 6 in which said strength elements comprise a layer of wires fitted together to form an armor layer surrounding said core.

8. A cable as in claim 6 in which said metal tape is made of copper and said plastic tape is made of polyester.

9. A method of making an underwater fiber-optic cable, said method comprising:
   (a) providing a fiber-optic core;
   (b) forming armor wires around said core to form a layer of contiguous wires surrounding said core;
   (c) wrapping a laminate of plastic and metallic tape around said layer of wires under tension; and
   (d) extruding a plastic sheath around said tape.

10. A method as in claim 9 in which said tension is greater than half of the breaking strength of said tape.

11. A method as in claim 9 in which the metal of said tape is a malleable metal.

12. A method as in claim 11 in which said metal is copper.

13. A method as in claim 9 in which said wires are laid at a relatively shallow first lay angle, and said tape is wound at a second lay angle relatively higher than said first lay angle.

14. A method as in claim 13 in which said first angle is in the range of 5° to 10°, and said second lay angle is in the range of 10° to 30°.

15. A method as in claim 10 in which said tension is in the range of 60% to 90% of the breaking strength of said tape.

16. A method as in claim 11 in which said plastic tape is polyester film.

* * * * *